US012680845B2

(12) United States Patent
Richter

(10) Patent No.: US 12,680,845 B2
(45) Date of Patent: Jul. 14, 2026

(54) METHOD FOR CALIBRATING A MEASURING APPARATUS

(71) Applicant: TEWS Elektronik GmbH & Co. KG, Hamburg (DE)

(72) Inventor: Hendrik Richter, Hamburg (DE)

(73) Assignee: TEWS ELEKTRONIK GMBH & CO. KG, Hamburg (DE)

( * ) Notice: Subject to any disclaimer, the term of this patent is extended or adjusted under 35 U.S.C. 154(b) by 446 days.

(21) Appl. No.: 18/035,444

(22) PCT Filed: Oct. 27, 2021

(86) PCT No.: PCT/EP2021/079813
§ 371 (c)(1),
(2) Date: May 4, 2023

(87) PCT Pub. No.: WO2022/096342
PCT Pub. Date: May 12, 2022

(65) Prior Publication Data
US 2025/0020494 A1 Jan. 16, 2025

(30) Foreign Application Priority Data
Nov. 3, 2020 (DE) ..................... 10 2020 128 966.9

(51) Int. Cl.
*G01D 18/00* (2006.01)
*G01K 11/00* (2006.01)
(Continued)

(52) U.S. Cl.
CPC ......... *G01D 18/008* (2013.01); *G01K 11/006* (2013.01); *G01K 19/00* (2013.01); *G01N 22/04* (2013.01)

(58) Field of Classification Search
None
See application file for complete search history.

(56) References Cited

U.S. PATENT DOCUMENTS

2003/0121754 A1 7/2003 King
2003/0121755 A1 7/2003 King
(Continued)

FOREIGN PATENT DOCUMENTS

DE 10253822 A1 5/2004
DE 102007057092 A1 6/2009

OTHER PUBLICATIONS

WIPO as ISA/WO, Notice of Transmittal of English Translation of the International Preliminary Report on Patentability (IPRP) with English language IPRP for International Application No. PCT/EP2021/079818, mailed May 3, 2023 and as published in German (total17 pgs.).

(Continued)

*Primary Examiner* — Shelby A Turner
*Assistant Examiner* — Cynthia L Davis
(74) *Attorney, Agent, or Firm* — Barclay Damon LLP

(57) ABSTRACT

A method for calibrating a measuring apparatus includes measuring a set of measured values for products including one or more measured variables. A first set of calibration parameters is determined having one or more weights for one or more of the products. The one or more products is grouped within a first product family. Some of the products in the first product family comprise an equal weight. At least a second set of calibration parameters is determined where one or more sets of additional weights are determined within the first product family. Products with equal weights are grouped into a sub product family within the first product family. Weights for the products outside of the first product family are determined and products with equal weights are grouped into another product family until all weights are determined.

12 Claims, 2 Drawing Sheets

(51) Int. Cl.
    *G01K 19/00*        (2006.01)
    *G01N 22/04*        (2006.01)

(56)           References Cited

U.S. PATENT DOCUMENTS

2003/0214485 A1 * 11/2003 Roberts ................. G06F 3/0418
                                         345/173
2010/0295556 A1    11/2010 Richter
2018/0052185 A1 * 2/2018 Kniffin ................. G01D 18/008

OTHER PUBLICATIONS

PCT/EP2021/079813, filed Oct. 27, 2021, International Search
Report and Written Opinion, dated Feb. 7, 2022 (11 pages).
PCT/EP2021/079813, filed Oct. 27, 2021, English translation of
International Search Report, dated Feb. 7, 2022 (2 pages).

* cited by examiner

METHOD FOR CALIBRATING A MEASURING APPARATUS

CROSS REFERENCE TO RELATED INVENTION

This application is a national stage application pursuant to 35 U.S.C. § 371 of International Application No. PCT/EP2021/079813, filed on Oct. 27, 2021, which claims priority to, and benefit of, German Patent Application No. 10 2020 128 966.9, filed Nov. 3, 2020, the entire contents of which are hereby incorporated by reference.

TECHNOLOGICAL FIELD

The present disclosure is directed to a method for calibrating a measuring apparatus for several products.

BACKGROUND

Measuring apparatuses of all kinds must be calibrated before startup. In the context of this calibration, the calibration parameters are determined for a calibration approach, such as for a linear approach, by searching for the best correspondence with given measured values and associated reference values. Calibration processes and the associated determination of a set of calibration parameters are known in principle. Generally, the calibration processes can also be performed automatically.

Possible differences between calibration relationships of different products have for example been previously taken into account in the microwave moisture measuring technique by calibrating the measuring apparatus for each product independent of the other products. The same effort is therefore required for calibration for all products. In addition, each individual calibration is subject to the same susceptibility to potential deficiencies in the data set such as for example statistical outliers in the measurement, insufficient variance of the reference values, or an excessively low number of measuring points. A frequently selected approach for calibration is multi-linear regression in which a linear relationship is assumed between the measured variables $x_j$ of the measuring system and the reference variable y:

$$y = c_1 x_{1,i} + c_2 x_{2,i} + \ldots + c_{n,i} + \epsilon_i$$

(i: Index of the individual measurement $\in \mathbb{N}$).

In this approach, it has become common parlance to refer to the factors as weights and to the additive constant as the offset value. The epsilon value refers to the measuring error arising during the measurement. In the moisture measuring technique with the assistance of microwaves, the measured variables are for example the widening of the resonance curve, the shift of the resonance frequency, a moisture angle, a temperature value, and the like. The reference variables for such a measuring system are, for example the moisture and density of the measured object.

The above equation for linear regression has been proven in matrix notation, wherein the following expression results:

$$\vec{y} = X \cdot \vec{c} + \vec{\epsilon}$$

with the matrix X $$X = \begin{pmatrix} x_{1,1} x_{2,1} & \ldots & x_{j,1} \\ \vdots & \ddots & \vdots \\ x_{1,N} x_{2,N} & \ldots & x_{j,N} \end{pmatrix}$$

and the vector $\vec{c}$ $$\vec{c} = (c_1, c_2, \ldots, c_j)^T$$

The calibration parameters differ in terms of the weights $c_i$ which are each multiplied with the measured value, and in terms of an offset value $c_n$ which results in a shift independent of the measured values $x_i$. The calibration parameters are determined as follows:

$$\vec{c} = \left(X^T X\right)^{-1}\left(X^T \vec{y}\right)$$

This approach for determining the calibration parameters is based on the above linear calibration model and determines the calibration parameters therefor. After determining the calibration weights, the vector $\vec{\epsilon}$ is then determined in a known manner, for example using a residual matrix.

For verification, it has become common practice to determine the significance of the calibration parameters. The measure that serves for this verification is the so-called p-value. In the test theory, this is an evidential measure of the credibility of a null hypothesis. For each calibration parameter, the null hypothesis consists of the assumption that its value is zero. For a p-value greater than, for example 5%, the influence of the measured variable on the target variable is considered insignificant, and the corresponding calibration parameter from the above approach is discarded. This process is performed iteratively as a so-called feature selection. The goal of iterative calibration is reached when all insignificant observation variables $x_j$ have been removed from the calibration model. It is conventional to first test higher-order measured variables such as for example quadratic dependencies and finally remove the zero order terms.

A method is known from DE 10 2007 057 092 A1 for measuring the moisture and/or density in a measured material using a microwave transmitter, a microwave receiver, and an evaluation unit. In the measuring method, the phase and the amplitude of the microwave radiation transmitted through the measured material is determined for a number of frequencies, wherein the complex-valued transmission function of the measured material is calculated from the determined values using the complex-valued transfer function of the measuring arrangement, and transformed into the time domain as a complex-valued time domain function. From the time domain function, the point in time of the maximum value of the main pulse is determined as characteristic A, and the width of the main pulse as characteristic B. The moisture and density of the measured material are determined depending on the characteristics A and B.

A method and a device are known from DE 102 53 822 A1 for automatic sensor calibration. Laboratory measurements are performed, and the obtained laboratory measured data are used to correct the online measured values produced by the sensors.

BRIEF SUMMARY OF THE INVENTION

The object of the invention is to provide a method for calibrating a measuring apparatus that is suitable for simplifying the calibration process for several products by recognizing the relationships in the data for different products.

An embodiment of the calibration method according to the invention is provided and intended for calibrating a measuring apparatus for several products. According to the invention, the method envisions providing a set of reference variables Y. The provided set of reference variables contains at least one reference variable to be determined by the measured variables. As with any calibration process, a set of measured variables is measured. The individual measured variables can be distinguished according to type. Furthermore, the product for which the measured variables were recorded and the measurements for which the measured variable was measured can be distinguished. A set of measured values ($X^p = \{x^p_{i,j}\}$) is therefore obtained, wherein j is used to count through one or more measured variables, p is used to count through the measured products, and i is used to count through several measurements. A set of reference variables ($Y^p = \{y^p_i$ i-th reference variable$\}$) with at least one reference variable (Y) to be determined by the measured variables ($x^p_{i,j}$) is added to the set of measured values.

DETAILED DESCRIPTION OF THE INVENTION

Figure 2:
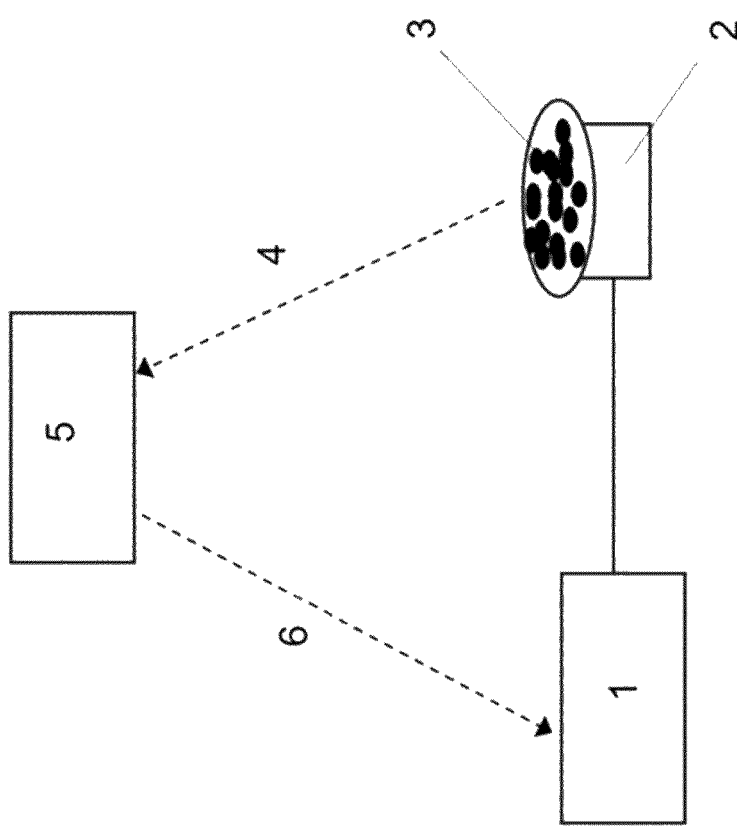
FIG. 2 schematically depicts a microwave measuring system for the measurement of moisture and/or density including an evaluation unit 1 including a processor, a sensor 2 operatively coupled to the evaluation unit 1.

Referring to FIG. 2, the product 3 is measured by a sensor 2 of an evaluation unit 1. For calibrating the measurement on one hand microwave measurements are performed and at the same time samples of the product 3 are taken. The microwave measurements are taken 4 to a reference measuring system 5, e.g. for moisture measurement a drying oven. After the detection of the reference measuring values, these values are combined 6 with the microwave measuring values in the microwave evaluation unit 1 to calculate the calibration. The method according to the invention furthermore provides that the measured variables for all products are grouped into an expanded set of measured values. In a subsequent step, a first set of calibration parameters is provided that possesses one or more weights for one or more products. The one or more products are grouped within a product family when they at least have an equal weight for their products. An equal weight means that the weight values do not significantly differ from each other. The method according to the invention furthermore provides that at least one additional set of calibration parameters is determined for a submatrix of the expanded matrix of the measured values. For this purpose, one or more sets with additional weights can be determined within the first product family, and several products with equal weights can be grouped in another product family. Subproduct families of the first product family are therefore formed. Additional sets with additional weights are determined outside of the first product family, and one or more products with equal weights are grouped in another product family. Ancillary product families are therefore formed, which of course can then again form subproduct families. In the product families, the one weight or several weights are linked to the measured value independent of the product. The at least one offset value is added to the linkage of weights and measured values. For this set of calibration parameters, the measuring device is calibrated for the expanded set of measured values. The particular idea of the invention is to combine the measured values for two or more products and treat them in the same way.

One important consideration is that it is unknown before calibration which products of a data set belong to a product family. This context is also determined from the measured values. This approach is surprising at first since the actual expectation is that the more precisely the product is delimited and determined, the more precisely the measuring apparatus can be calibrated for this product. This approach is, however, disadvantageous with regard to measuring inaccuracies or statistical fluctuations that may arise in the measured values. The particular advantage of the approach according to the invention is that one or more weights for the products can be found that are independent of the type of product within the product family. These product-independent weights can be determined much more accurately within the framework of the calibration process than weights that only have a smaller database due to their product dependence. In the method according to the invention, the products of a product family are such that at least one of the weights for two or more products of the product family can be determined independently therefrom. This also includes the instance in which a first weight is selected independent of the products and a second weight is selected depending on the products if two measured values are needed for the measuring process to determine the output variable. In this case, the product-independent weight can be statistically determined much more accurately than the product-dependent weight.

In one embodiment of the method, the weights are linked to the measured values by multiplication. This yields an overall linear approach for determining the variables. Alternative to this, it is also possible to link the weights to the measured values by polynomials or include the measured values in the form of products and/or quotients. Depending on the selected approach, different computational methods can be used to determine the first and remaining sets of calibration parameters.

In one preferred embodiment, the significance of the determined calibration parameters is determined using its weights and/or its offset values. This is accomplished in that no significance can be found for the inequality of the weights and offset values of different products. If the inequality is insignificant, then the values for the weights and offsets can be equated. To check the significance of the weights and offset values, a null hypothesis is formulated such that the difference of the values for two products is equal to zero. The probability of the occurrence of this null hypothesis is determined. When testing the offset values, the difference between the two offset values or two weights is formed for two products. As a null hypothesis to be tested, it is then investigated whether the difference has the value zero. If this null hypothesis cannot be rejected, i.e. if the difference parameter has the value zero, both products of the product family can be equated with respect to the investigated calibration parameter (weights, offset values).

In an embodiment of the method according to the invention, the calibration parameters are determined by a multilinear regression. This is well known and can be reliably performed. To perform the differentiation of the products in the data, non-numerical categorical variables are inserted. These are used, for example, to indicate that the measured values belong to different products. In the expanded data matrix, the non-numerical, categorical variables serve as dummy variables to differentiate between the measured values. For this, columns can be appended in the expanded matrix of the measured values that contain a "1" for the individual products and identify other products by a "0".

In one preferred development, the microwave measuring apparatus is designed as a microwave resonator that determines a shift in its resonance frequency and/or a spreading of its resonance curve. Proceeding from these two values, values of the moisture of the product can, for example, be determined. Other measured variables, the temperature and/or moisture angle, are preferred which also contribute to the output variables, such as the moisture of the product.

An embodiment of the method according to the invention will be further explained below with reference to an exemplary embodiment. The exemplary embodiment refers to moisture measurement as is performed with the aid of the microwave measuring technique. Different products within a product family frequently only differ from each other slightly, be it by an additional or omitted additive, a different leaf position on the stem of plants, or a slightly changed product structure. Such minor differences and variations can lead to slight deviations in the binding of the water molecule in the product and therefore to a small change in the calibration coefficients. Stronger variations, for example from additional additives that strongly differ from each other in terms of their dielectric properties can, however, lead to stronger deviations in the calibration parameters. The chemical and physical similarity can be checked with the aid of an adapted null hypothesis. Normally, a significant level such as 5% is set for the test and compared with the p-value. The smaller the p-value, the greater the justification to reject the null hypothesis. If the p-value is less than the given significance level, the null hypothesis is rejected. If the p-value is in contrast larger than the significance level, the null hypothesis cannot be rejected.

In the known approaches for calibrating a measuring apparatus, the null hypothesis is always used; the calibration parameter ci of a product of the product family does not differ from zero. It is accordingly checked whether the hypothesis is a likely assumption that the measured variable assigned to the calibration parameter does not contribute to the result. This hypothesis when determining the calibration parameter leads to the fact that the product of a product family must always be considered isolated for itself. For each product of the product family, the calibration parameters are determined and then tested for their significance.

The method according to the invention works with the grouped measured variables where two or more products of the product family are grouped into an expanded set. In this case, the significance test seeks to find if the difference in calibration parameters of two products of the product family significantly differs from zero. For these two products, this means that if the null hypothesis cannot be rejected, the same calibration parameter can be used for calibration. The calibration parameters of the two tested products of the product family are in this sense product-independent and equivalent.

This new null hypothesis is weaker than the conventional null hypothesis because the additional information on the similarity of the members of the product family is used in the calibration. This blunts the requirement on the quality of the data set, and the calibration effort is correspondingly reduced. In the practical use of the measuring apparatus, this reduction has particular advantages since, when the products within a product family change slightly, another calibration process is not needed; instead, the calibration parameters that have already been found can be adapted together with the new measured values, and existing calibration parameters can possibly still be used despite the change to the product within the product family.

To implement the idea, it is necessary to group the measured values obtained for the different products into an expanded set of measured values. One potential approach for this is so-called dummy coding that is also termed a proxy variable. In statistical data analysis, a variable is introduced with the expression 0 and 1 (yes/no variable), which serves as an indicator for the presence of a multilevel variable.

In order to mathematically account for this categorical assignment, a separate dummy variable is introduced for each member of the product family as well as for each measured variable. For the simplest case of a linear regression with identical weights and only two categories A and B, the calibration equation assumes the following form:

$$y_i = c_1 \cdot x_i + c_2 + \Delta c_2 \cdot \left\{ \begin{array}{l} 0 \text{ for category } A \\ 1 \text{ for category } B \end{array} \right\} + \varepsilon_i.$$

In this equation, $c_1$ designates the calibration weight with which the measured variable $x_i$ contributes to the output variable yi. The offset value $c_2$ is formulated as a common coefficient for the category A and B. There is also the categorical distinction between the categories A and B, according to which an additional offset value is not contributed for category A, and the additional offset value $\Delta c2$ is added for category B.

The variable $\varepsilon_i$ is also an additive expression that jointly occurs with $y_i$ as the output variable and does not depend on the measured value $x_i$. To summarize the above, for category A, this means:

$$y_i = c_i \cdot x_i + c_2 + \varepsilon_i$$

and for category B $$y_i = c_i \cdot x_i + c_2 + \Delta c_2 + \varepsilon_i.$$

With these dummy variables, an expanded data matrix results simply from an additional column in the following form:

$$X = \begin{pmatrix} x_1^{(A)} & 1 & 0 \\ \vdots & \vdots & \vdots \\ x_{N_A}^{(A)} & 1 & 0 \\ x_1^{(B)} & 1 & 1 \\ \vdots & \vdots & \vdots \\ x_{N_B}^{(B)} & 1 & 1 \end{pmatrix}$$

In the data matrix, the right column causes the parameter $\Delta c$ to be multiplied by zero for the measured values of category A, and the measured value $\Delta c$ to be multiplied by 1 for the measured values of category B. The epsilon variable $\varepsilon_i$ is added independent of the measured values in order to compensate for the measurement errors that arise. For this new data matrix, the p-values can be calculated for the calibration parameters. Since the new calibration parameter $\Delta c2$ represents the difference between the offset values of two categories, its p-value provides information on whether this difference is significant or can be combined for the two offset values. This approach can be transferred to all of the calibration parameters.

For the other calibration parameters, a distinction can be made between an inner and an outer development: With the inner development, the calibration parameters within a product family that have not been determined are determined. The case can arise that parameters again occur which are not significantly different so that additional product families arise within the product family. For example, with regard to the first weight, products 1, 3 and 5 can have equal values, i.e. only insignificantly different values, but with regard to the second weight, products 1 and 5 can have equal values, whereas the weight for product 3 has a significantly different value. In addition to the inner development, there is also an outer development in which calibration parameters are sought for products not yet grouped into a product family, such as products 2 and 4. If an identical calibration parameter is then found, for example, for products 2 and 4, this can form the starting point for an inner development. The result of the inner and outer development is that as many products as possible are grouped into product families, which reduces the number of calibration parameters to be determined and improves the statistical basis for determining the parameters.

Figure 1:
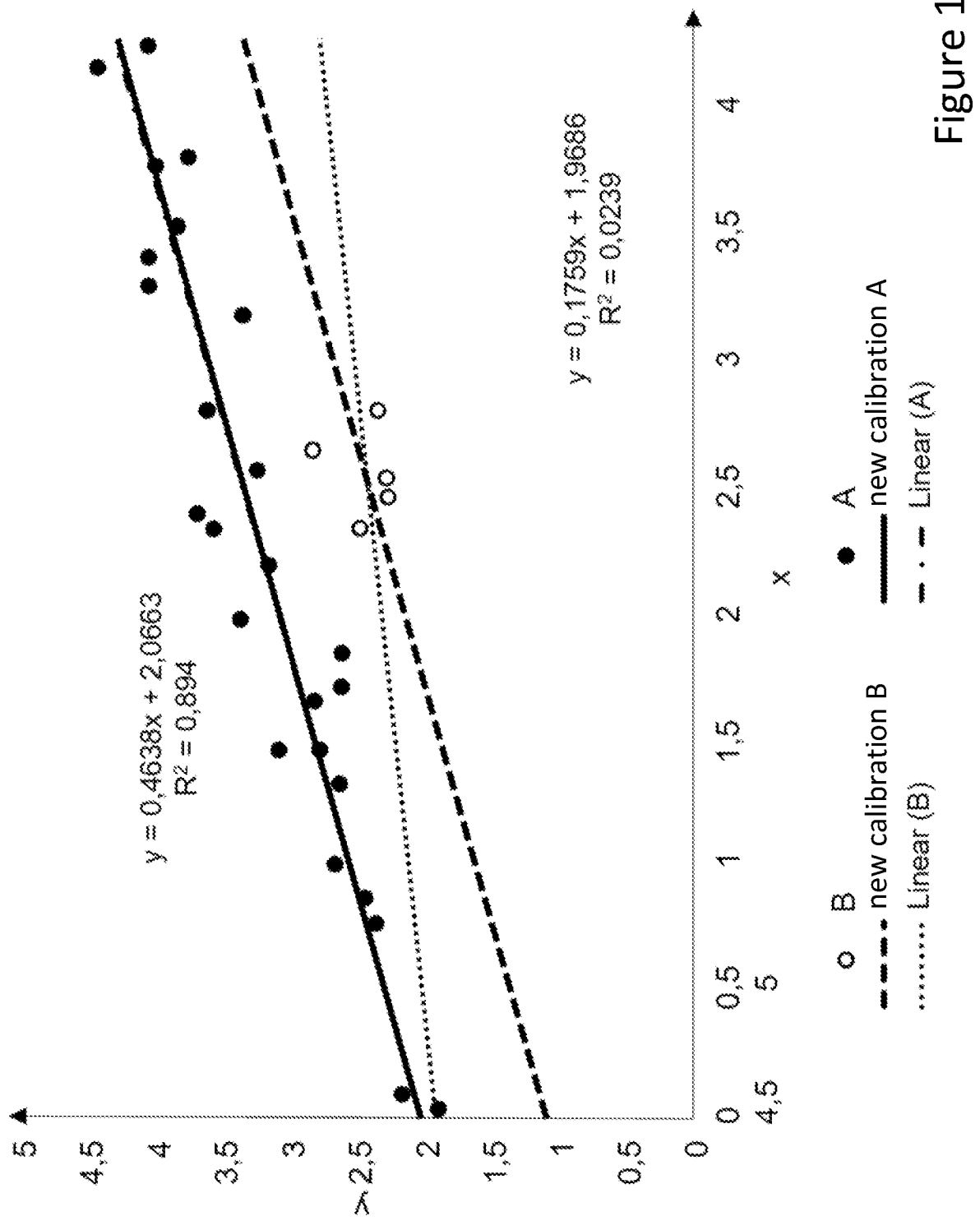
FIG. 1 graphically illustrates two data sets simulated according to two models.

The above-described method with the modified null hypothesis results in the fact that similarities in the data are recognized and used for calibration. The invention also proposes a method in which the calibration parameters of different products are combined. It is possible in principle for some calibration parameters to be identical for products of category A and category B, and other calibration parameters to be significantly different. To simplify the method, it can therefore be provided that the difference parameters that have the highest p-value are combined into a group, wherein all calibration parameters of these two products are then equated. This method can then be repeated with the product family reduced by a product as long as, for example, the calibration parameters remain constant over the product family. In the following, the invention will be explained in more detail with reference to FIG. 1. In FIG. 1, two data sets were simulated according to the following models:

$$y^{(A)} = 0.5 \cdot x^{(A)} + 2 + \varepsilon^{(A)},$$

$$y^{(B)} = 0.5 \cdot x^{(B)} + 1 + \varepsilon^{(B)}.$$

Let the reference uncertainty $\varepsilon$ be equally distributed for both categories with $\varepsilon = +/-0.26$. This means that the data of the two categories only differ in terms of their offset value by the value 1, but not in terms of their slope. The data sets are shown in FIG. 1. The upper data points which are shown lighter have a good $R^2$ value of 0.894 which indicates a good model fit. The lower values which are shown dark have an $R^2$ value of 0.0239, which indicates a poor fit, a so-called poor model fit. This means that data set B with only five data points, which lie in a narrow range between 2.5 and 3.5, is of low data quality and therefore does not permit the reproduction of the slope parameter with sufficient precision. The data set A with its 25 data points possesses a larger value range with good quality, even though the slope parameter only reaches 92% of the actual slope (see 0.4638 with 0.5) due to the relatively high reference uncertainty.

The slope parameter $c_1$ determined with the method according to the invention is however:

$$c_1 = 0.46.$$

Given the large difference in the weight factor, it is almost identical to the slope value from category A. Accordingly, the difference in the offset parameter $\Delta c_2$ is exactly met with 1, even though both offset values $c_2$ are too large due to the slightly too small slope parameter.

The data values from the example in FIG. 1 are summarized in the following Table 1:

TABLE 1

| Category (c) | N | $\sigma_k^2$ | Weight factor | $c_1^{(k)}$ | $c_1$ | $c_2^{(k)}$ |
|---|---|---|---|---|---|---|
| A | 25 | 2.05 | 49.3 | 0.46 | 0.46 | 2.1 |
| B | 5 | 0.04 | 0.17 | 0.18 | 0.46 | 1.1 |

It can clearly be seen that, in the conventional method, the slope parameter $c_1$ is once 0.46 and once 0.18 depending on the product, and therefore does not match the slope of the model well with 0.5. The two right coefficients in the table are calculated using the method according to the invention and are much better in line with the modeling both in terms of the distance of the offset value and in terms of the level of the values.

In practice, this means that product B with its lower quality data set profits from the good quality of the data set of product A and is therefore calibrated with same quality as product A.

The invention claimed is:

1. A computer-implemented method for calibrating a microwave measuring apparatus for a plurality of products, the method being executed by a processor operatively connected to the microwave measuring apparatus, comprising:

measuring, using one or more sensors of the microwave measuring apparatus, a set of measured values ($X^P = \{x^P_{i,j}\}$) for the plurality of products, wherein the set of measured values comprises one or more measured variables (j) corresponding to physical properties of the products;

providing a corresponding set of reference variables ($Y^P = \{y^P_i$ i-th reference variable$\}$) representing known reference parameters of the products;

determining, by the processor, at least one of the set of reference variables (Y) based on the one or more measured variables ($x^P_{i,j}$);

generating an expanded matrix of the set of measured values for the plurality of products;

determining a first set of calibration parameters (C') comprising one or more weights $$\left(c_j^p\right)$$

for one or more of the plurality of products (p), wherein the one or more of the plurality of products (p) is grouped within a first product family, wherein the one or more of the plurality of products in the first product family comprise an equal weight ($c_j$) that is independent of a product;

determining at least a second set of calibration parameters (C'') for a submatrix of the expanded matrix (X') of the measured values to calibrate the microwave measuring apparatus with respect to a subset of the products;

determining one or more sets of additional weights within the first product family, wherein products (p) having equal weights $$(c_j^p)$$

are grouped into a sub product family within the first product family;

determining weights for the plurality of products outside of the first product family, wherein products (p') having equal weights $$(c_j^{p'})$$

are grouped into another product family, until all weights are determined for the calibration of the microwave measuring apparatus;

identifying relationships between the measured values across product families using the expanded matrix; and automatically adjusting one or more of first and second calibration coefficients of the microwave measuring apparatus based on the determined first and second sets of calibration parameters (C', C") and the identified relationships.

2. The method according to claim 1, further comprising determining the weights of the first set of calibration parameters and the additional weights inside and outside the first product family, wherein weights on which the set of reference variables least depend are determined first.

3. The method according to claim 1, further comprising:

determining one or more offset values ($\Delta$c); and combining the one or more offset values to the measured values multiplied by the weights.

4. The method according to claim 3, further comprising grouping different products in a same product family when any weight difference or offset difference between them is determined to be statistically insignificant.

5. The method according to claim 3, further comprising testing a significance of the one or more offset values by formulating a null hypothesis such that a difference between the offset values ($\Delta$c) of two products is equal to zero.

6. The method according to claim 1, further comprising linking the weights to polynomials of the measured values, and wherein weights are provided for at least one of (i) products and (ii) quotients of measured values.

7. The method according to claim 1, further comprising determining the calibration parameters by multilinear regression.

8. The method according to claim 1, further comprising determining the submatrix of the measured values for determining the calibration parameters corresponding to the first product family or additional product families for a subset of the measured values ($X^p$).

9. The method according to claim 1, further comprising inserting the measured values and the products of the product family by non-numerical, categorical variables.

10. The method according to claim 9, further comprising inserting dummy variables to differentiate the products when grouping the expanded matrix.

11. The method according to claim 1, wherein the microwave measuring apparatus is configured as a microwave resonator that determines a shift in one of: (i) a resonance frequency; and (ii) a widening of a resonance curve.

12. The method according to claim 1, wherein the one or more measured variables of the microwave measuring apparatus are at least one of (i) temperature (T); and (ii) moisture angle ($\varphi$).

* * * * *